United States Patent [19]

Murakami et al.

[11] Patent Number: 4,969,440
[45] Date of Patent: Nov. 13, 1990

[54] KNOCKING SUPPRESSION APPARATUS FOR AN INTERNAL COMBUSTION ENGINE

[75] Inventors: Nobuaki Murakami, Tokyo; Satoshi Komurasaki; Syohichi Katoh, both of Himeji, all of Japan

[73] Assignees: Mitsubishi Jidosha Kogyo Kabushiki Kaisha; Mitsubishi Denki Kabushiki Kaisha, both of Tokyo, Japan

[21] Appl. No.: 355,268

[22] Filed: May 19, 1989

[30] Foreign Application Priority Data

May 19, 1988 [JP] Japan ................ 63-122673

[51] Int. Cl.$^5$ .............................. F02P 5/15
[52] U.S. Cl. ...................... 123/425; 73/35
[58] Field of Search ........... 123/425, 435; 73/35; 364/431.08

[56] References Cited

U.S. PATENT DOCUMENTS

| 4,319,480 | 3/1982 | Yamguchi et al. | 73/35 |
| 4,467,634 | 8/1984 | Rohde et al. | 73/35 |
| 4,583,175 | 4/1986 | Abe et al. | 123/425 X |
| 4,607,602 | 8/1986 | Komurasaki | 123/425 |
| 4,637,245 | 1/1987 | Iwata et al. | 73/35 |

FOREIGN PATENT DOCUMENTS 2098326 4/1982 United Kingdom .
2201780 9/1988 United Kingdom .

Primary Examiner—Tony M. Argenbright
Attorney, Agent, or Firm—Sughrue, Mion, Zinn, Macpeak & Seas

[57] ABSTRACT

A knocking suppression apparatus for an internal combustion engine has a noise removal circuit which is disposed between an acceleration sensor, which senses engine knocking, and a phase shifter, which controls the ignition timing of the engine. The noise removal circuit includes a switch which can be opened and closed to prevent signals from being input to the phase shifter, and a window comparator. When the window comparator determines that the output of the acceleration sensor contains high-level noise signals, the noise removal circuit opens the switch for a prescribed period to prevent the high-level noise signals from being input to the phase shifter and influencing the ignition timing.

4 Claims, 17 Drawing Sheets (A)

FIG. 16
(B)
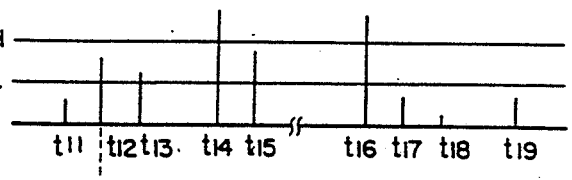
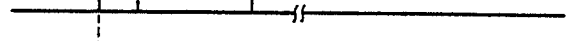
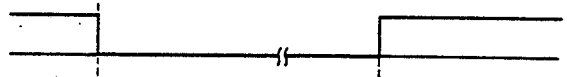
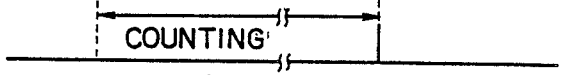
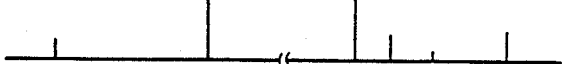

KNOCKING SUPPRESSION APPARATUS FOR AN INTERNAL COMBUSTION ENGINE

BACKGROUND OF THE INVENTION

This invention relates to a knocking suppression apparatus for an internal combustion engine which suppresses knocking by adjusting the ignition timing of the engine. More particularly, it relates to a knocking suppression apparatus which can distinguish between noise due to engine knocking and high-level noise due to other causes and adjust the ignition timing only when knocking is taking place.

A knocking suppression apparatus is a device which suppresses knocking of an internal combustion engine by adjusting the ignition timing of the engine. FIG. 1 is a block diagram of a conventional knocking suppression apparatus for an internal combustion engine. As shown in this figure, an acceleration sensor 1 which is mounted on an unillustrated engine senses accelerations due to engine vibrations and generates a corresponding output signal which is input to a band-pass filter 2. The band-pass filter 2 passes only that component of the output signal of the acceleration sensor 1 lying in a frequency band corresponding to engine knocking, and this component is input to an analog gate 3 which can be turned on and off in order to block noise which is an impediment to the detection of knocking signals. The opening and closing of the analog gate 3 is controlled by a gate controller 4. The output of the analog gate 3 is provided to a noise level sensor 5 which generates an output signal having a DC voltage which is proportional to the average amplitude of the rectified output of the analog gate 3.

The output of the analog gate 3 and the output of the noise level sensor 5 are input to a comparator 6, which generates output pulses when the input signal from the analog gate 3 is higher than the input signal from the noise level sensor 5. The output pulses from the comparator 6 are integrated by an integrator 7, which generates an output signal whose voltage corresponds to the strength of the knocking of the engine.

A signal generator 9 generates pulses at a frequency corresponding to the rotational speed of the engine. These pulses are shaped by a waveform shaper 10 and input to a phase shifter 8. The output signal of the integrator 7 is also provided to the phase shifter 8. The phase shifter 8 generates output pulses having a phase which is shifted from that of the output of the waveform shaper 10 by an amount corresponding to the magnitude of the output signal of the integrator 7. The output pulses of the phase shifter 8 operate a switching circuit 11 which controls the supply of current to an ignition coil 12.

FIG. 2 illustrates the frequency characteristics of the output signal of the acceleration sensor 1. In the figure, curve A shows the characteristics of the output signal when there is no knocking, and curve B shows the characteristics of the output signal when knocking is occurring. In addition to a knocking signal (a signal which is generated by knocking), the output signal of the acceleration sensor 1 contains various other noise components such as components due to mechanical noise of the engine, ignition noise, and noise due to the signal transmission pathway.

Comparing curve A and curve B of FIG. 8, it can be seen that the knocking signal has unique frequency characteristics.

Accordingly, although the frequency distribution of the knocking signal will differ from engine to engine and in accordance with differences in the location in which the acceleration sensor 1 is mounted, there is always a clear difference in the characteristics of the output of the acceleration sensor 1 when knocking is taking place.

By passing only the frequency component corresponding to the knocking signal, noise having other frequency components is suppressed and the knocking signal can be efficiently detected.

The operation of the conventional apparatus of FIG. 1 will be explained while referring to FIGS. 3 and 4, which illustrate the waveforms of the output signals of various portions of the conventional knocking suppression apparatus of FIG. 1. FIG. 3 illustrates the case when there is no knocking and FIG. 4 illustrates the case when knocking is taking place in the engine. When the engine is operating, the ignition signal which is generated by the signal generator 9 in accordance with previously-determined ignition timing characteristics undergoes waveform shaping in the waveform shaping circuit 10 to form pulses which are input to the phase shifter 8. The pulses drive the switching circuit 11 via the phase shifter 8 and switch the current to the ignition coil 12 on and off. When the current to the ignition coil 12 is cut off, the ignition coil 12 generates a high voltage which is applied to unillustrated spark plugs of the engine.

The engine vibrations which occur during engine operation are detected by the acceleration sensor 1, which generates an output signal as shown by FIG. 3a. When the engine is not knocking, the output signal of the acceleration sensor 1 does not include a component due to knocking but it includes components due to other mechanical vibrations or due to ignition noise which is superimposed on the signal transmission pathway at the time of firing F of the cylinders.

This signal is passed through the band-pass filter 2, and a large part of the mechanical noise component is suppressed, as shown in FIG. 3b. However, as the ignition noise component is strong, it has a high level even after passing through the band-pass filter 2, as shown by the spikes in FIG. 3b.

In order to prevent the ignition noise from being misidentified as knocking signals, the analog gate 3 is closed for a prescribed length of time each time one of the cylinders is fired. The analog gate 3 is closed by a pulse (FIG. 3c) which is output by the gate controller 4, which is triggered by the output of the phase shifter 8, and as a result, the ignition noise is removed. Therefore, only low-level mechanical noise remains in the output of the analog gate 3, as shown by curve (i) of FIG. 3d. This output signal is provided to the noise level sensor 5 and the comparator 6.

The noise level sensor 5 responds to changes in the peak level of the output signal of the analog gate 3. It can respond to a relatively gradual change in the peak value of normal mechanical noise, and it generates an output signal having a DC voltage which is slightly higher than the peak of the mechanical noise (curve (ii) in FIG. 3d). This output signal is also provided to the comparator 6.

The comparator 6 generates an output signal when the input signal from the analog gate 3 is higher than the input signal from the noise level sensor 5. As shown in FIG. 3d, when knocking is not taking place, the output of the noise level sensor 5 is higher than the average peak value of the output signal of the analog gate 3, so that as shown in FIG. 3e, nothing is output from the comparator 6.

The integrator 7 integrates the output signal from the comparator 6, and when knocking is not taking place, the output signal of the integrator 7 is zero as shown in FIG. 3f.

The phase shifter 8 shifts the phase of the input signal from the waveform shaper 10 (shown by FIG. 3g) in accordance with the voltage of the output signal of the integrator 7. When there is no knocking, the integrator 7 output voltage is zero, so the phase shifter 8 does not produce a phase shift, and the output signal of the phase shifter 8 (FIG. 3h) is in phase with the output signal of the waveform shaper 10. As a result, the engine is operated with a reference ignition timing.

However, when knocking takes place, the output of the acceleration sensor 1 contains a knocking signal which is delayed from the ignition timing by a certain amount, as shown in FIG. 4a. After this signal passes through the band-pass filter 2 and the analog gate 3, it consists of mechanical noise on which the knocking signal is superimposed, as shown by curve (i) in FIG. 4d.

Of the signals which pass through the analog gate 3, the knocking signal is particularly steep, so the response of the output voltage of the noise level comparator 5 is delayed with respect to the knocking signal. As a result, the inputs to the comparator 6 are as shown by curves (i) and (ii) in FIG. 4d, and the comparator 6 generates output pulses, as shown in FIG. 4e.

The integrator 7 integrates the pulses from the comparator 6 and generates a voltage corresponding to the amount of knocking, as shown in FIG. 4f. Then, the phase shifter 8 generates an output signal (FIG. 4h) which is delayed with respect to the output signal of the waveform shaper 10 (FIG. 4h) by a prescribed amount corresponding to the output voltage of the integrator 7. Therefore, the ignition timing is retarded by the prescribed amount, and knocking is suppressed.

The time constant of the apparatus of FIG. 1 (the number of seconds per degree of engine rotation) which expresses the speed at which the output of the integrator 7 is decreased, and therefore the speed at which the ignition timing returns towards the reference timing after the occurrence of knocking, is a large value. This time constant is an important control characteristic, since if the lag angle is decreased too rapidly after the occurrence of knocking, the engine will abruptly enter a knocking region and knocking will again occur.

Therefore, in order to ensure an appropriate time constant, it is necessary to determine the amount of knocking each time knocking occurs by measuring the output of the integrator 7 immediately before and immediately after each time that knocking is detected, and then to find the change in the amount of knocking. This procedure involves complicated calculations, and it is not sufficient merely to read the value of the integrator 7 at the time of knocking detection.

It is therefore necessary to store the output of the integrator 7 before the occurrence of knocking and after the occurrence of knocking and to find the difference between the two stored values.

Recently, engine control is tending to become increasingly sophisticated. There is a tendency to control each cylinder individually so as to improve the combustion conditions of all the cylinders and increase the engine output.

In order to perform such control, it is necessary to detect the amount of knocking each time knocking occurs and to find the amount of knocking of individual cylinders.

However, complicated calculations are necessary to determine the amount of knocking each time knocking occurs based on the output of the integrator 7 in the above-described conventional apparatus. Furthermore, in order to determine the amount of knocking of each cylinder, the scale of the circuit has to be further increased, which is not easy.

FIG. 5 is a block diagram of an example of another type of knocking suppression apparatus for an internal combustion engine which can easily detect the amount of knocking each time knocking occurs and which can easily determine the amount of knocking of individual cylinders.

In FIG. 5, elements numbers 1–6, 11, and 12 are the same as in FIG. 1, so an explanation thereof will be omitted. This apparatus is further equipped with a cylinder pulse generator 21 which generates pulses corresponding to the ignition of each cylinder of the engine. These pulses are input to a circuit closing controller 22 which outputs an ignition pulse which guarantees the conducting time of the ignition coil 12. The output of the circuit closing controller 22 is provided to a phase shifter 23 which controls the phase of ignition pulses which are provided to the switching circuit 11 so as to obtain a desired ignition timing.

The output signal of the comparator 6 is provided to an integrator 24 which generates an output signal having a voltage which is proportional to the number of pulses from the comparator 6 per unit time. This integrator 24 also differs from the integrator 7 of FIG. 1 in that its output voltage is not made to gradually decrease over time. The integrator 24 receives the output signal of the phase shifter 23 and resets itself each time one of the cylinders of the engine is fired.

The output signal of the integrator 24 is converted into a digital signal by an A/D converter 25, and the resulting digital signal is provided to a distribution circuit 26. According to which cylinder is knocking, the distribution circuit 26 provides the digital signal to one of four different memories 27–30, each of which corresponds to one of the four cylinders of the engine. The memories 27–30 store the digital signals from the distribution circuit 26.

A clock signal generator 31 generates output pulses at prescribed intervals and provides these pulses to the memories to cause a decrease in the values stored in the memories 27–30.

Each of the memories is connected to a selector 32 which selects the memory containing data corresponding to the cylinder which is firing.

A reference pulse generator 33 generates reference pulses corresponding to a reference cylinder of the four cylinders of the engine and provides the reference pulses to a cylinder selection pulse generator 34. Based on the reference pulses and the output of the circuit closing controller 22, the cylinder selection pulse generator 34 successively generates cylinder selection pulses which control the operation of the distribution circuit 26 and the selector 32 so that the appropriate memory will be accessed.

The output signals of the acceleration sensor 1 and the noise level sensor 5 are provided to a failure sensor 40 which detects failures in the form of breakage of signal wires between the acceleration sensor 1 and the band-pass filter 2, shorts to ground, and abnormal output voltages of the noise level sensor 5. When a failure is sensed, the failure sensor 40 generates failure signals KF which are sent in parallel to the integrator 24, a fuel controller, a vehicle diagnosis apparatus, and other unillustrated members.

The operation of the apparatus of FIG. 5 will be explained while referring to FIGS. 6 and 7, which are waveform diagrams similar to FIGS. 3 and 4 and respectively illustrate the case in which there is no knocking and when there is knocking. When engine knocking is not taking place, the two input signals to the comparator 6 are as shown by curves (i) and (ii) in FIG. 6d. Since in this case the input signal from the analog gate 3 is always less than the input signal from the noise level sensor 5, the comparator 6 does not generate an output signal (FIG. 6e). Accordingly, the output signal of the integrator 24 is zero, as shown by FIG. 6f. Therefore, no value is stored in memories 27-30, and the selector 32 does not produce any output, so there is no phase difference between the input signal of the phase shifter 23 (FIG. 6g) and its output signal (FIG. 6h). As a result, the ignition coil 12 is driven with the reference ignition timing Next, the case in which knocking occurs will be explained while referring to FIG. 7. In this case, the output signal of the analog gate 3 (curve (i) of FIG. 7d) contains knocking signals which exceed the level of the output of the noise level sensor 5 (curve (ii). Therefore, the comparator 6 generates pulses as shown in FIG. 7e, and these pulses are integrated by the integrator 24, which generates an output signal having a magnitude K as shown in FIG. 7f.

Knocking detection is carried out with respect to each cylinder, so upon each ignition, the output of the integrator 24 is reset by the output of the phase shifter 23. The output of the integrator 24 remains constant from the time of the last output pulse of the comparator 6 until the integrator 24 is reset.

The above-described process is carried out upon each ignition at intervals equal to the ignition period. The output of the integrator 24 is converted into a digital signal by the A/D converter 25. Based on the cylinder selection pulse from the cylinder selection pulse generator 34, the distribution circuit 26 discriminates which cylinder is knocking, and it inputs the digital output of the A/D converter 25 to the memory corresponding to the cylinder which is knocking. For example, if the third cylinder is knocking, the output of the A/D converter 25 is stored in memory 29.

Memory 29 stores the output signal from the distribution circuit 26. Based on the cylinder selection pulse from the cylinder selection pulse generator 34, the selector 32 selects memory 29 and provides its output to the phase shifter 23. As a result, the phase shifter 23 delays its output signal (FIG. 7h) with respect to its input signal (FIG. 7g) by an angle $\theta$ corresponding to the output voltage of the integrator 24.

As can be seen from FIG. 7b, knocking also occurs in the cylinder which is fired immediately after the third cylinder, which in a normal four-cylinder engine is the fourth cylinder. Therefore, the output of the integrator 24 is stored in memory 30 by the distribution circuit 26. Then, upon the next firing of the fourth cylinder, the output of memory 30 which was selected by the selector 32 is input to the phase shifter 23.

Next, the manner in which the ignition timing of each cylinder is individually controlled will be explained while referring to FIG. 8, which shows the signals which are generated by various portions of the apparatus of FIG. 5 and the contents of the four memories 27-30. In FIG. 8, (s) indicates the number of the cylinder which is firing, (e) is the output of the comparator 6, (f) is the output of the integrator 24, (j), (k), (1), and (m) are the values stored in memories 27-30, (p) is the output of the selector 32, and (g) and (h) are respectively the input and the output of the phase shifter 23.

As shown in FIG. 8e, knocking pulses appear in the output of the comparator 6 due to knocking which occurs successively in the third cylinder, the second cylinder, the third cylinder, the fourth cylinder, and the second cylinder. The output pulses of the comparator 6 are integrated by the integrator 24, which generates the output signals shown in FIG. 8f.

Here, K1, K2, K3, and K5 indicate the voltages of the output signals of the integrator 24 and correspond to the amount of knocking which was detected. In order of small to large, they are ranked K1, K2, K3 and K5.

At time t1, knocking begins to occur in the third cylinder, and the output of the integrator 24 becomes voltage K5. This voltage K5 is converted into a digital signal by the A/D converter 25 and is input to the distribution circuit 26.

The distribution circuit 26 selectively outputs the digitalized voltage K5 to memory 29, corresponding to the third cylinder, at the time of firing t2 of the fourth cylinder, and at this time, K5 is stored in memory 29 (FIG. 8l).

Next, at time t3, the second cylinder begins to knock, and the resulting output pulses of the comparator 6 are converted into a voltage K5 by the integrator 24. This voltage K5 is converted into a digital signal by the A/D converter 25, it is selectively input to memory 28, corresponding to the second cylinder, by the distribution circuit 26, and at time t4, which is the firing time for the first cylinder, this value is stored in memory 28 (FIG. 8k).

Also at time t4, voltage K5 which is stored in memory 29 is output from the selector 32 (FIG. 8p) and is input to the phase shifter 23.

As a result, the phase shifter 23 delays its next output pulse (FIG. 8h) with respect to the input pulse (FIG. 8g) by an angle $\theta 5$, corresponding to voltage K5. Therefore, firing takes place at time t5 and is delayed by angle $\theta 5$ with respect to the reference ignition timing.

At time t6, knocking again occurs in the third cylinder, but this time the knocking is of a lower level, and the integrator 24 generates an output voltage K2. At time t7, which is the firing time of the fourth cylinder, voltage K2 is added to voltage K5 which is already stored in memory 29, and the content of memory 29 becomes a new voltage K7, as shown in FIG. 8l.

Knocking takes place in the fourth cylinder beginning at time t8, and so the integrator 24 outputs a corresponding voltage K3. This voltage K3 is stored in memory 30, corresponding to the fourth cylinder, at the firing time t9 of the second cylinder.

At time t7, memory 28 corresponding to the second cylinder is selected by the selector 32 and the voltage K5 stored therein is input to the phase shifter 23. As a result, the time of the next firing becomes time t9 which is delayed from the reference timing by an angle $\theta 5$ corresponding to the voltage K5.

Knocking again takes place in the second cylinder at time t10, and the integrator 24 generates a corresponding voltage K1. At the time t11 of the next cylinder firing, this voltage K1 is added to the voltage K5 already in memory 28 and the value stored in memory 28 becomes voltage K6, as shown in FIG. 8k.

At time t11, the selector 32 selects memory 29 corresponding to the third cylinder, the voltage K7 which is stored in memory 29 is input to the phase shifter 32, and the next firing time is delayed from the reference timing by a corresponding angle $\theta 7$.

Thereafter, the same type of lag angle control is repeated, the next firing time (time t13) of the fourth cylinder is delayed from the reference timing by an angle $\theta 3$, and the next firing time of the second cylinder is delayed by an angle $\theta 6$.

In the above manner, the firing time is delayed in accordance with the detected amount of knocking (the output voltage of the integrator 24). If knocking stops occurring in the engine, the firing time is advanced at a prescribed rate back towards the reference timing. Namely, the values stored in memories 27-30 are decreased at a prescribed rate based on the clock pulses from the clock signal generator 31. As the values stored in the memories decrease, the voltages which are input to the phase shifter 23 also decrease, so the delay angle is decreased, and the reference timing is approached.

The most common type of failure which is detected by the failure sensor 40 is severing of a signal path. This can be caused by poor contact between connectors. When the failure sensor 40 detects a failure due to this or other cause, it generates a failure signal KF which is input to the integrator 24. The failure signal KF causes the integrator 24 to generate a prescribed output having no relation to the input signal from the comparator 6.

FIGS. 9 and 10 illustrate two examples of the output which could be generated by the integrator 24 when it receives a failure signal KF from the failure sensor 40. In the example of FIG. 9, a failure signal KF causes the integrator 24 to generate an output pulse having the maximum voltage $Vo_{MAX}$ which can be output by the integrator 24. Each time the phase shifter 23 generates an ignition signal (at time F), the integrator 24 is reset and its output falls to zero.

In the example of FIG. 10 as well, the integrator 24 outputs a voltage $Vo_{MAX}$ when a failure signal KF is generated, but the ignition signal from the phase shifter 23 is made ineffective and the output of the integrator 24 is not reset each time one of the cylinders is fired.

The output voltage of the integrator 24 at the time of failure need not be the maximum output $Vo_{MAX}$ of the integrator 24 but can be a lower value, selected in accordance with the knocking characteristics or other characteristics of the engine.

In this manner, $Vo_{MAX}$ will be stored in all of memories 27-30, and the engine will operate with a predetermined failure ignition timing which prevents knocking from occurring.

The failure signal KF can also be input to a fuel controller so that the fuel supply can be controlled in accordance with the failure timing, and it can be input to a diagnostic apparatus which generates a warning to indicate that a failure has occurred.

If the phase shifter 23, the integrator 24—selector 32, and the cylinder selection pulse generator 34 of FIG. 5 are constituted by a computer, a sophisticated system can be obtained which can perform fine control not only of the ignition timing but also of the fuel supply.

The apparatus of FIG. 5 can be used to individually control the ignition timing of each of the cylinders. However, if the distribution circuit 26 and the selector 32 are suitably controlled, the apparatus can be made to perform either individual control of the cylinders or to uniformly control all the cylinders so as to have the same ignition timing.

While the apparatus of FIG. 5 is able to perform adequate knocking suppression in certain circumstances, it has the problem that it is unable to distinguish between knocking signals an high-level noise due to other causes. Therefore, high-level noise signals can cause the apparatus to retard the ignition timing more than is necessary, and suitable timing control can not be performed.

This problem will be explained in more detail with reference to FIG. 11, which illustrates the output of the analog gate 3 (lower curve) and of the noise level sensor 5 (upper curve) of the apparatus of FIG. 5 during the operation of an actual engine. FIG. 11a shows the case in which the output of the analog gate 3 contained only low-level noise, and FIG. 11b shows the case in which it included high-level noise not due to knocking.

In the case of FIG. 11a, the output signal of the analog gate 3 was always lower than the output of the noise level sensor 5, so the integrator 24 did not generate any output signal.

However, in the case of FIG. 11b, the output of the analog gate 3 contained high-level noise which exceeded the output of the noise level sensor 5. When this high-level noise was generated, the integrator 24 generated an output voltage.

FIG. 12 shows a portion of the waveforms of FIG. 11b with an expanded time scale. As shown in this figure, high-level noise was produced during the firing of the first cylinder, the fourth cylinder, and the second cylinder. As the level of this high-level noise exceeded the level of the output of the noise level sensor 5, the integrator 24 generated a corresponding output voltage each time the high-level noise was produced.

If the high-level noise is a momentary phenomenon, the output of the integrator 24 will not be large enough to significantly disturb the engine timing, and the high-level noise will not be a problem. However, in the case of the engine tested by the present inventors, if a large amount of noise was once generated, the output of the integrator 24 was high enough to disturb the engine timing, it continued long enough to lead to an excessive fall in output, and an excessive lag angle was produced in the engine timing. This high-level noise was repeatedly generated by specific cylinders each time they were fired.

It was found that this high-level noise was higher in level than usual noise, but that for the most part it was lower in level than signals due to knocking.

The integrator 24 can be prevented from generating an output due to this high-level noise simply by increasing the level of the output of the noise level sensor 5, but this is not a satisfactory solution to the problem since many knocking signals which should be detected would become impossible to detect, and adequate knocking suppression would become impossible.

FIG. 13 shows the output of the analog gate and the integrator 24 for a somewhat longer period of time than that illustrated in FIG. 12. For three successive ignitions of the first cylinder, the integrator 24 generated an output due to high-level noise.

SUMMARY OF THE INVENTION

Accordingly, it is an object of the present invention to provide a knocking suppression apparatus for an internal combustion engine which can distinguish between noise due to knocking and high-level noise due to other causes and adjust the ignition timing only when knocking is detected.

A knocking suppression apparatus for an internal combustion engine in accordance with the present invention is equipped with a noise removal circuit which is connected between an integrator and a phase shifter. The noise removal circuit receives the output signal of the integrator and determines, by means of a window comparator, whether the integrator output signal is a signal caused by knocking or whether it a high-level noise signal due to other causes. If the noise removal circuit determines that the output signal of the integrator is due to high-level noise, the output signal of the integrator is prevented from being input to the phase shifter for a prescribed length of time and accordingly does not influence the ignition timing of the engine. If during the prescribed period the noise removal circuit determines that the output signal of the integrator is due to knocking, the output signal is input to the phase shifter and is reflected in timing control of the engine.

A knocking suppression apparatus for an internal combustion engine in accordance with the present invention comprises sensing means for sensing accelerations of an engine including accelerations due to engine knocking and generating a corresponding output signal, knocking signal generating means responsive to the output signal of the sensing means for generating a knocking signal indicative of the amount of knocking in the engine, timing control means responsive to the knocking signal for controlling the ignition timing of the engine so a to decrease the amount of knocking, and noise removal means connected between the knocking signal generating means and the timing control means for preventing the knocking signal from being input to the timing control means for a prescribed period when the knocking signal has a level between an upper level and a lower level and enabling the knocking signal to be input to the timing control means during the prescribed period when the knocking signal exceeds the upper level.

In preferred embodiments, the noise removing means includes a controllable switch connected between the knocking signal generating means and the timing control means, and a window comparator which opens the switch when the output signal of the knocking signal generating means is high-level noise having a value between the upper limit and the lower limit. When the switch is opened, the output signals of the knocking signal generating means are prevented from being input to the timing control means and therefore do not affect the ignition timing.

In preferred embodiments, the knocking signal generating means comprises a band-pass filter which filters the output of the sensing means, a comparator which compares the filtered output with a reference level and generates pulses when the reference level is exceeded, and an integrator which integrates the output pulses of the comparator to obtain a knocking signal.

BRIEF DESCRIPTION OF THE DRAWINGS

In the drawings, the same reference numerals indicate the same or corresponding parts.

DESCRIPTION OF THE PREFERRED EMBODIMENTS

Figure 1:
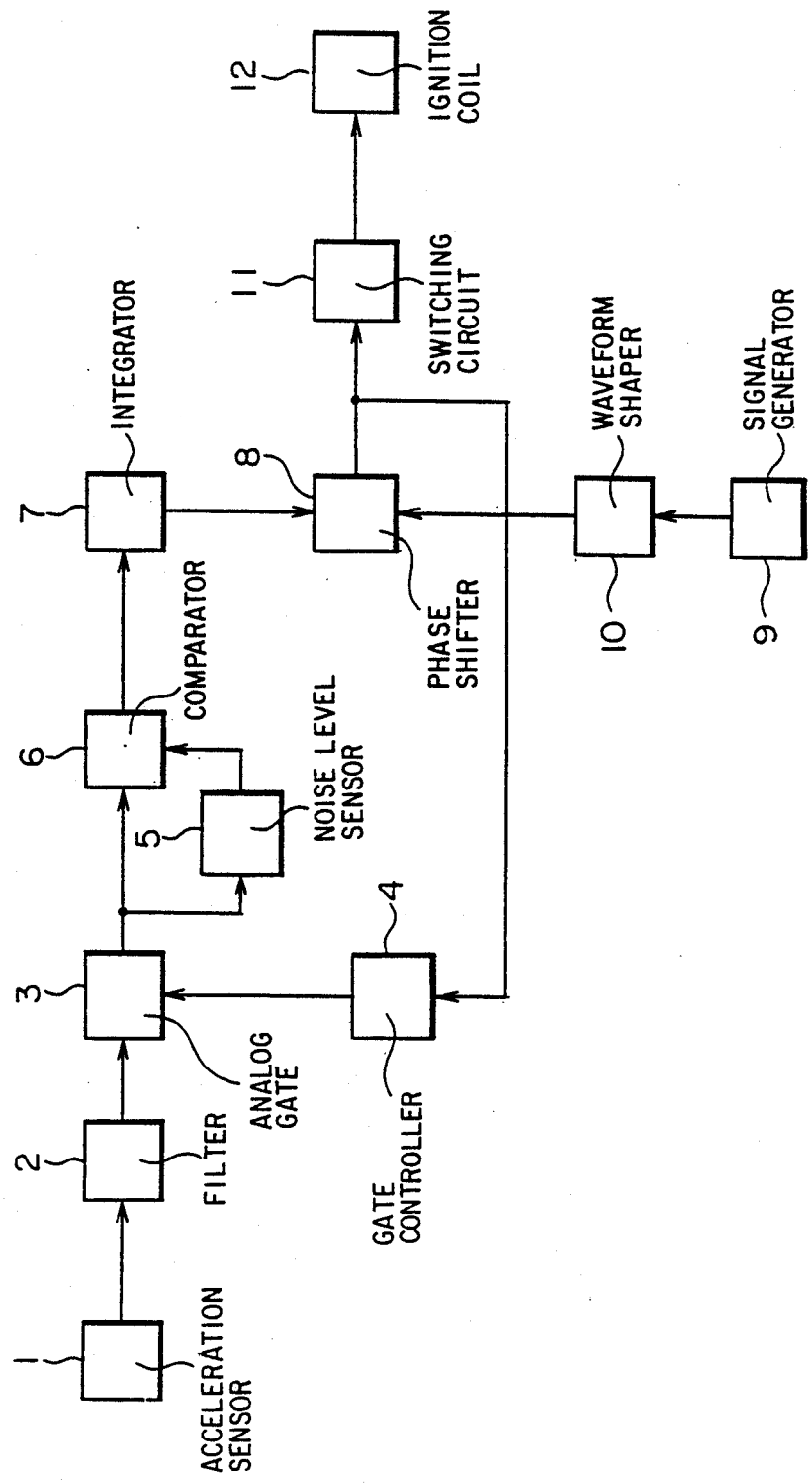
FIG. 1 is a block diagram of a conventional knocking suppression apparatus for a internal combustion engine.
Figure 2:
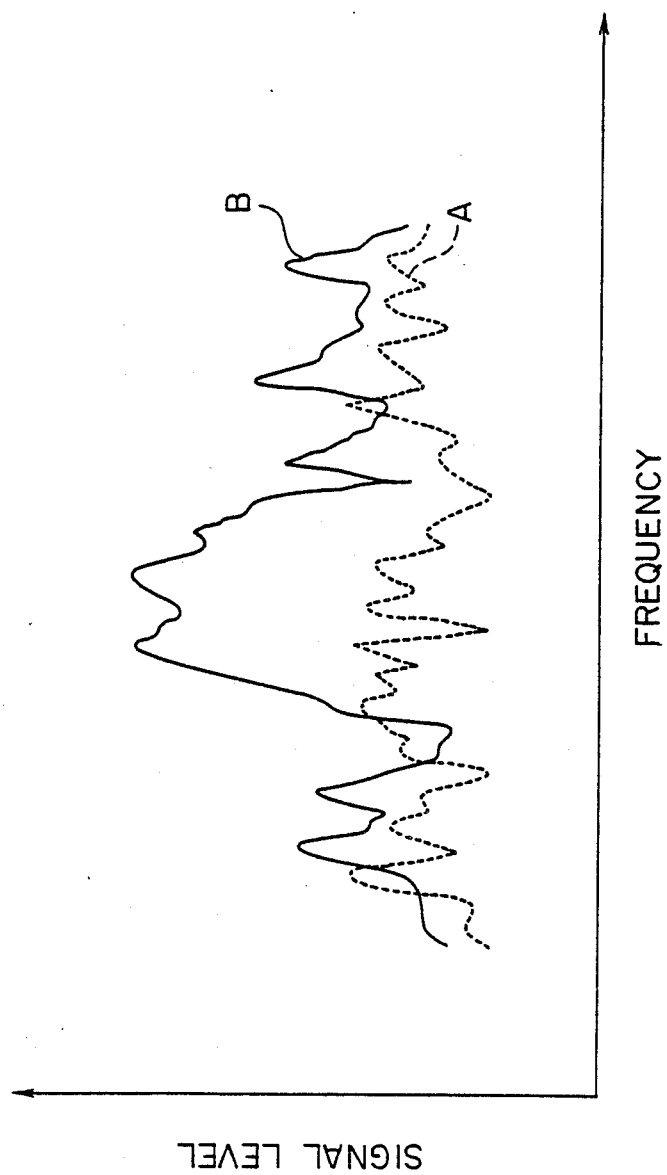
FIG. 2 is a graph of the frequency distribution of output signals of the acceleration sensor 1 of the apparatus of FIG. 1.
Figure 3:
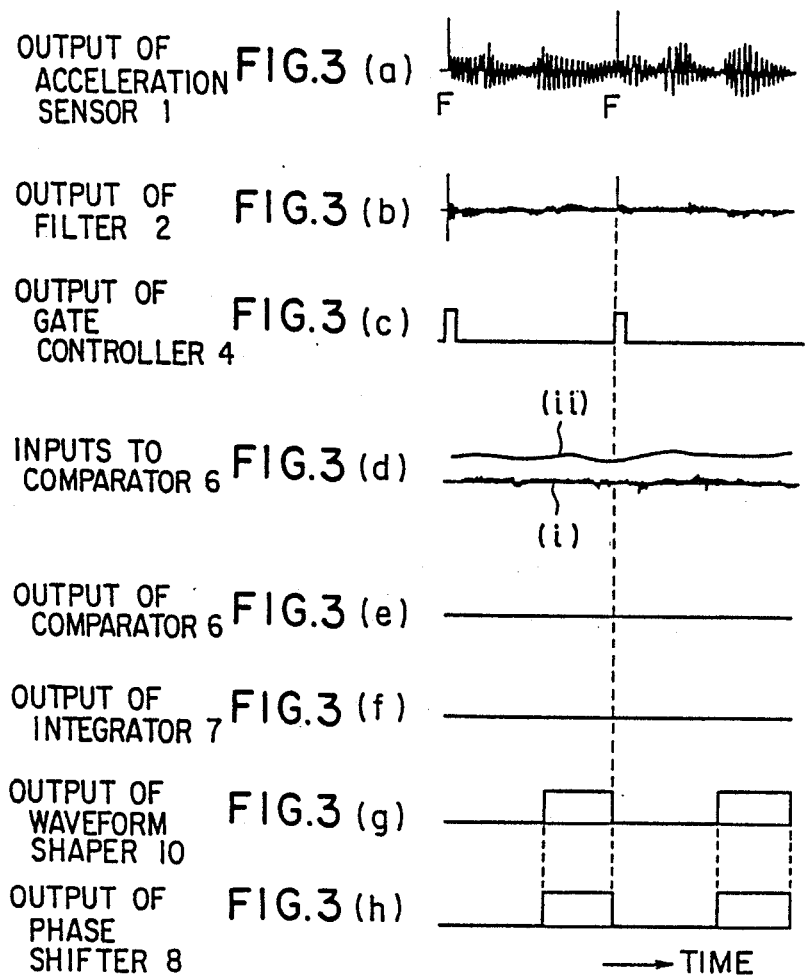
FIGS 3(a-h) show the waveforms of the output signals of various portions of the apparatus of FIG. 1 when there is no knocking.
Figure 4:
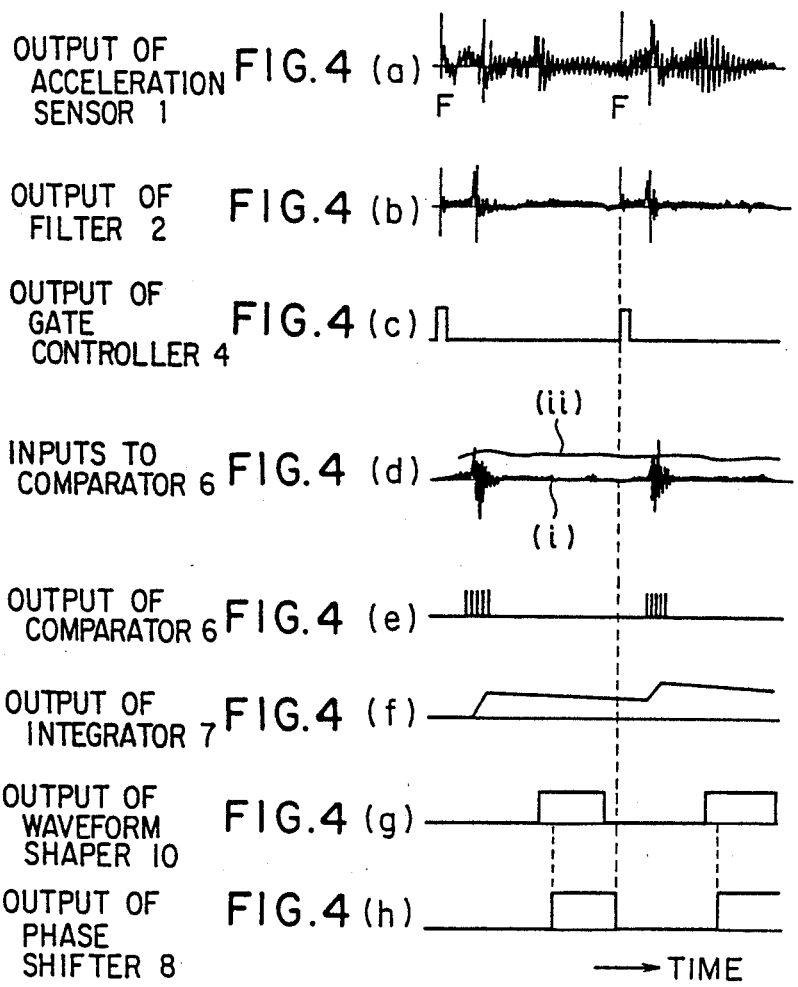
FIGS. 4(a-h) show the waveforms of the output signals of the same portions when knocking is taking place.
Figure 5:
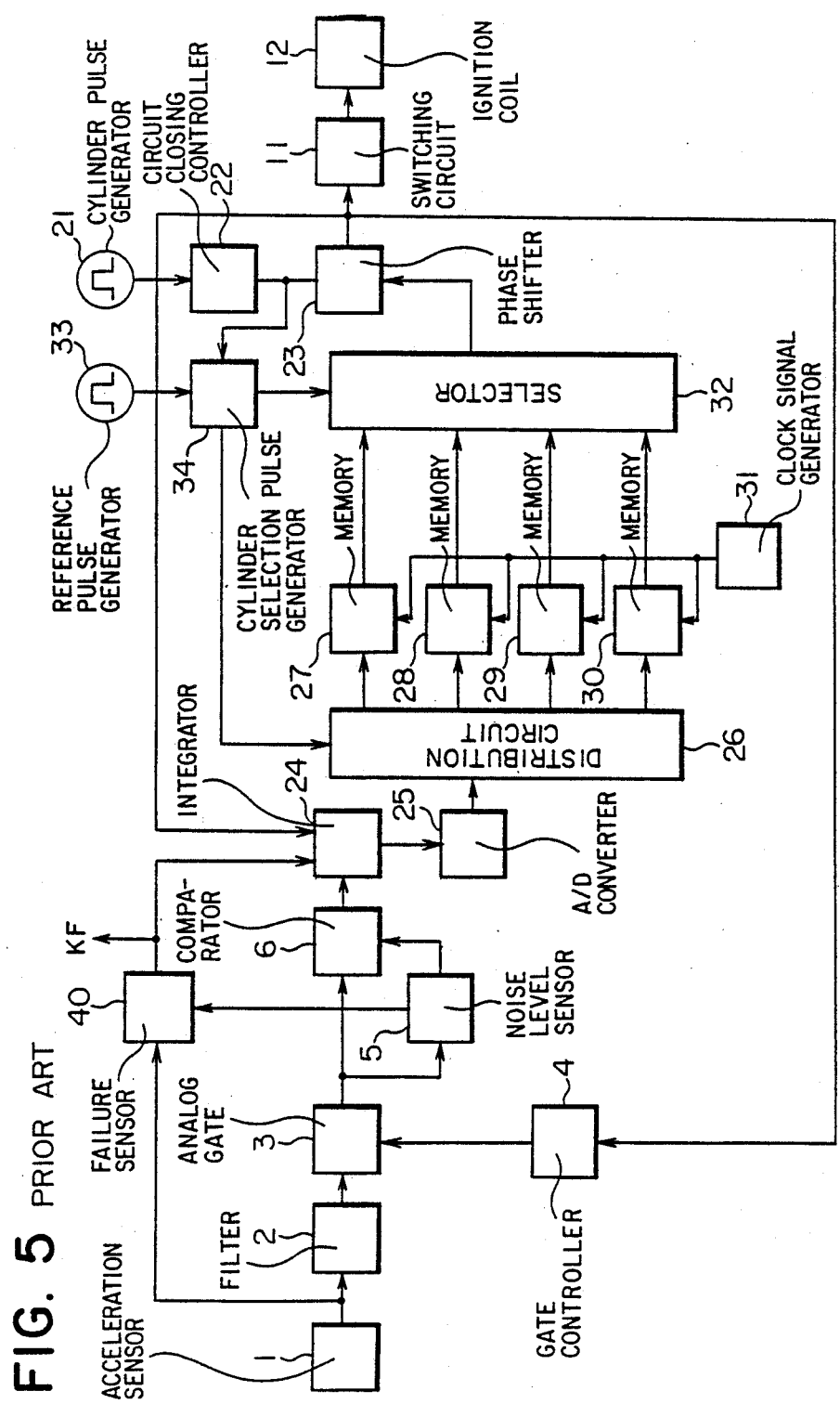
FIG. 5 is a block diagram of another conventional knocking suppression apparatus.
Figure 6:
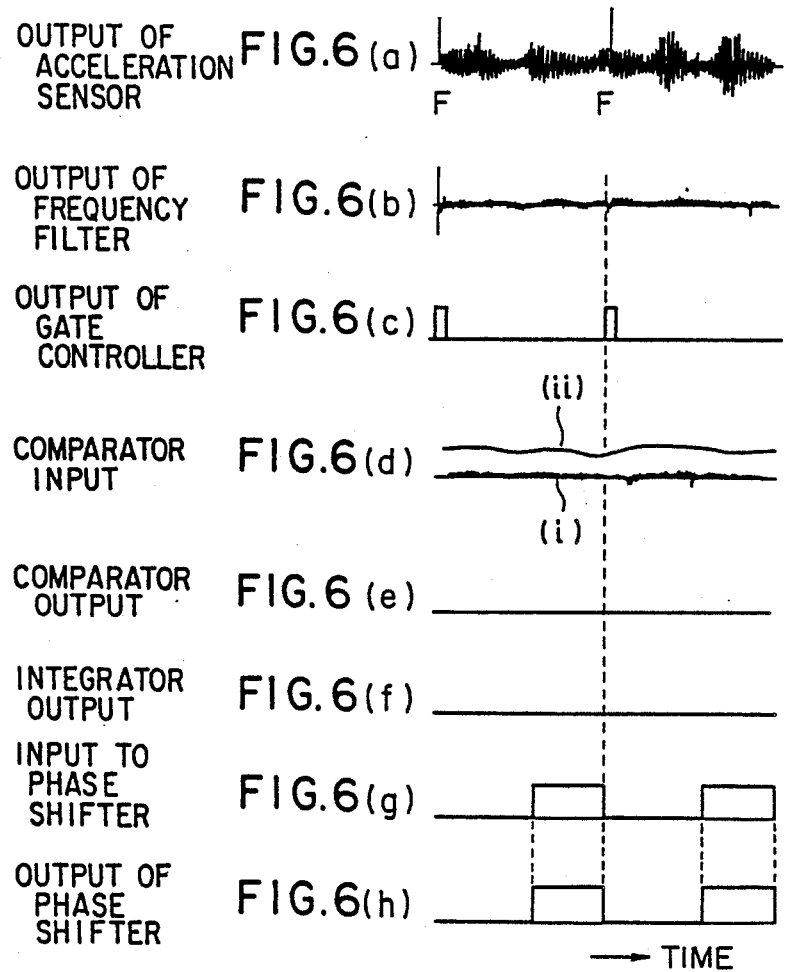
FIGS. 6(a-h) show the waveforms of the output signals of various portions of the apparatus of FIG. 5 when there is no knocking.
Figure 7:
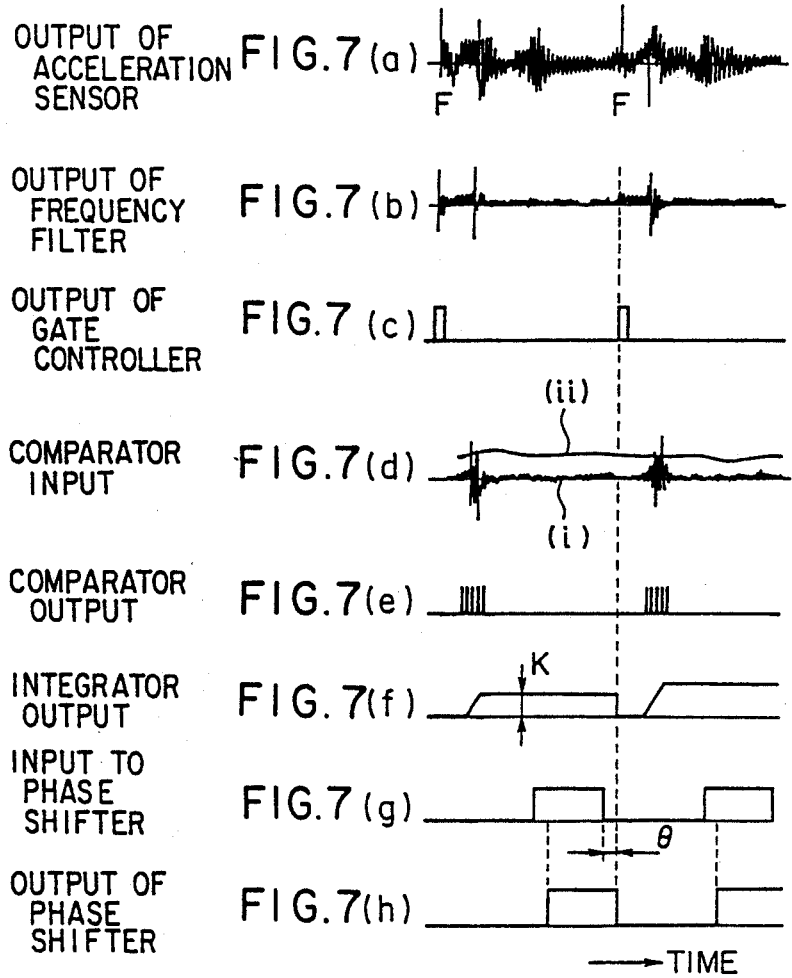
FIGS. 7(a-h) show the waveforms of the output signals of the same portions when knocking is taking place.
Figure 8:
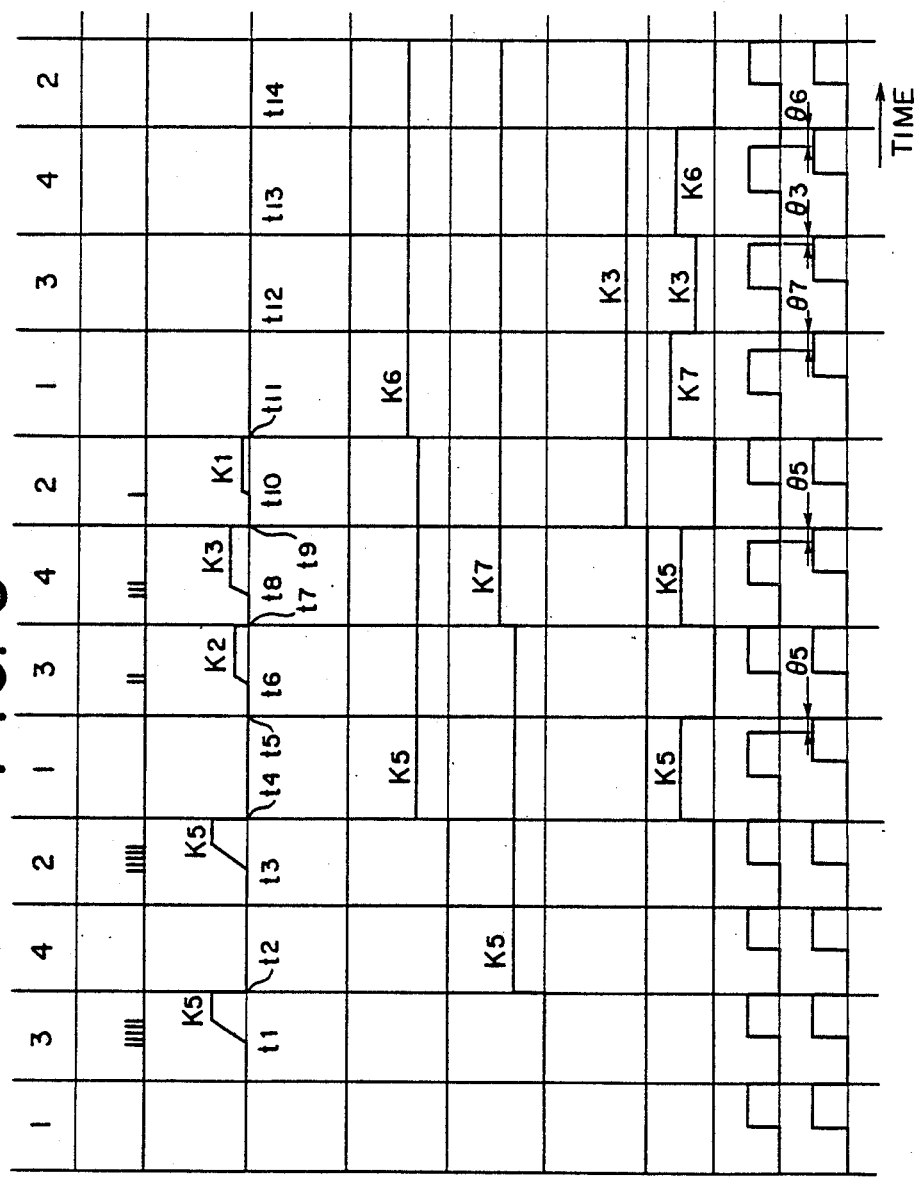
FIG. 8 is a waveform diagram of the outputs of various portions of the apparatus of FIG. 5 over an extended period.
Figure 9:
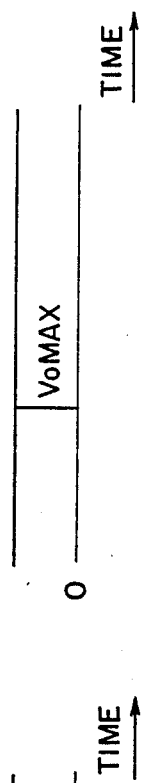
FIG. 9 shows one example of the output of the integrator 24 of FIG. 5 when a failure is detected.
Figure 10:
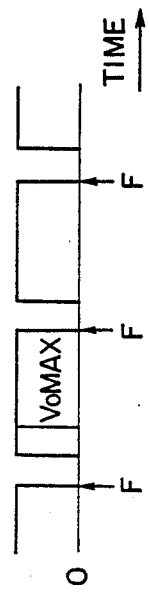
FIG. 10 shows another example of the output of the integrator 24 at the time of failure.
Figure 11:
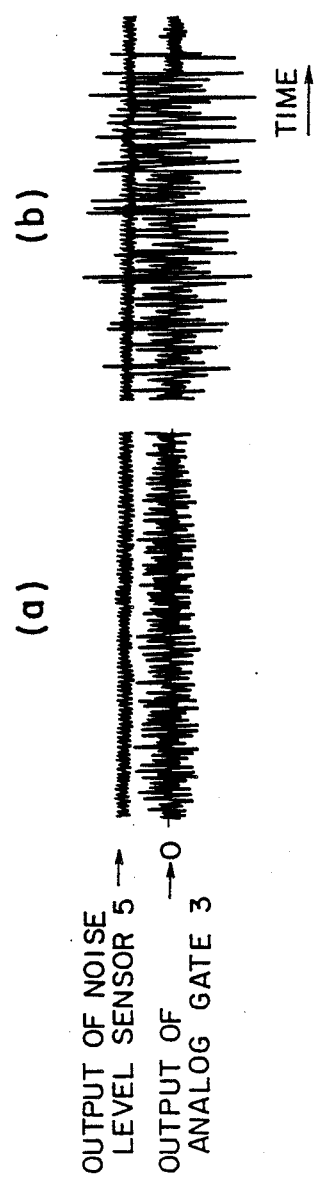
FIGS. 11(a) and 11(b) show the output of the analog gate 3 and the noise level sensor 5 of FIG. 5 during operation of an actual engine.
Figure 12:
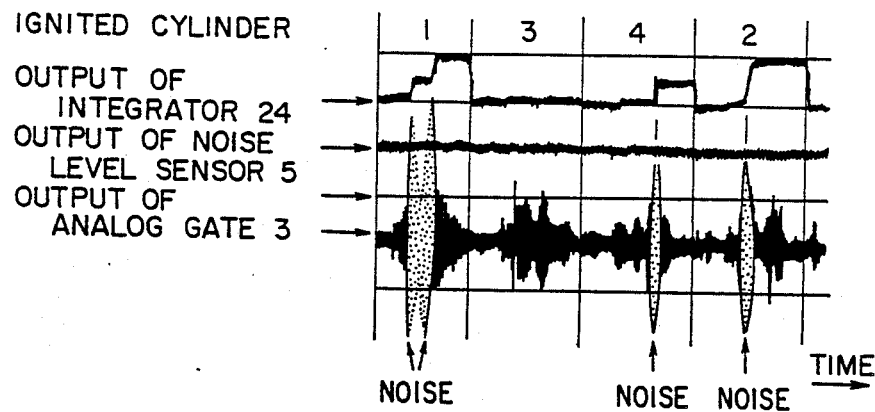
FIG. 12 shows a portion of FIG. 11b with an expanded time scale.
Figure 13:
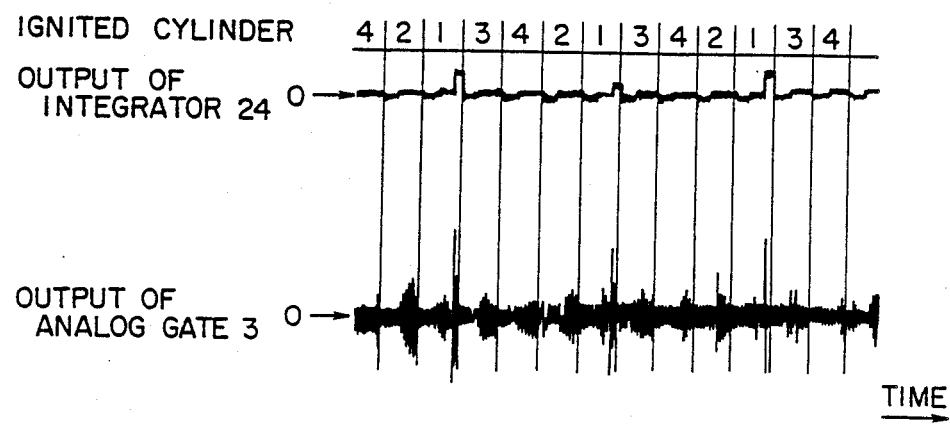
FIG. 13 shows the output of the analog gate 3 and the integrator 24 of FIG. 5 over three successive ignitions of each of the cylinders of a four-cylinder engine.
Figure 14:
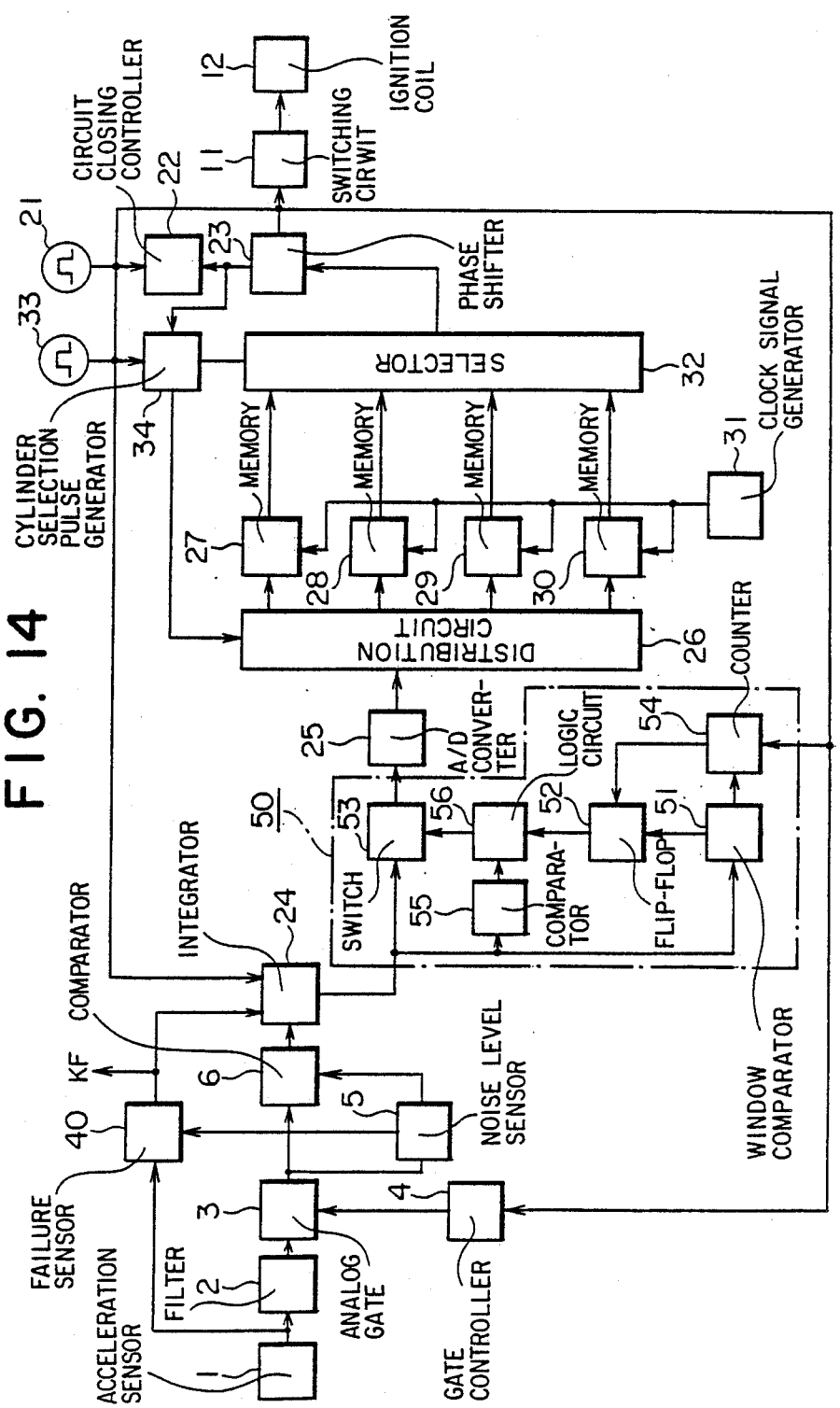
FIG. 14 is a block diagram of a first embodiment of a knocking suppression apparatus according to the present invention.

Hereinbelow, a number of preferred embodiments of the present invention will be described while referring to the accompanying drawings. FIG. 14 is a block diagram of a first embodiment. As can be seen from FIG. 14, this embodiment differs from the conventional apparatus of FIG. 5 in that a noise removal circuit 50 is disposed between an integrator 24 and an A/D converter 25. The noise removal circuit 50 removes high-level noise from the output of the integrator 24 and prevents it from being input to the A/D converter 25. The structure is otherwise the same as that of the apparatus of FIG. 5.

The noise removal circuit 50 is equipped with a window comparator 51 which receives the output signal of the integrator 24, which will be referred to as a knocking signal $V_R$ since it indicates the amount of knocking in the cylinders. When the knocking signal $V_R$ from the integrator 24 is between an upper limit $V_{NH}$ and a lower limit $V_{NL}$, the window comparator 51 generates an output signal which is provided to a flip-flop 52 and a counter 54. The output of the cylinder pulse generator 21 is also input to the counter 54. The flip-flop 52 is set by the output of the counter 54, and it is reset by the output of the window comparator 51.

The knocking signal $V_R$ from the integrator 24 is also input to a comparator 55 and a switch 53. The comparator 55 compares the knocking signal $V_R$ of the integrator 24 with the above-mentioned upper limit $V_{NH}$ and generates an output signal when the upper limit $V_{NH}$ is exceeded. The output of the comparator 55 and the output of the flip-flop 52 are output to a logic circuit 56. In accordance with the input signals from the flip-flop 52 and the comparator 55, the logic circuit 56 generates an output signal which controls the operation of the switch 53. The logic circuit 56 closes the switch 53 whenever the comparator 55 generates an output signal indicating that the upper limit $V_{NH}$ has been exceeded. In the absence of this signal from the comparator 55, the logic circuit 56 opens the switch 53 when the flip-flop 52 is set and closes the switch 53 when the flip-flop 52 is reset. When the switch 53 is closed, the knocking signal from the integrator 24 can be input to the A/D converter 25. When the switch 53 is open, the output of the integrator 24 is not input to the A/D converter 25 and is ignored.

Figure 15:
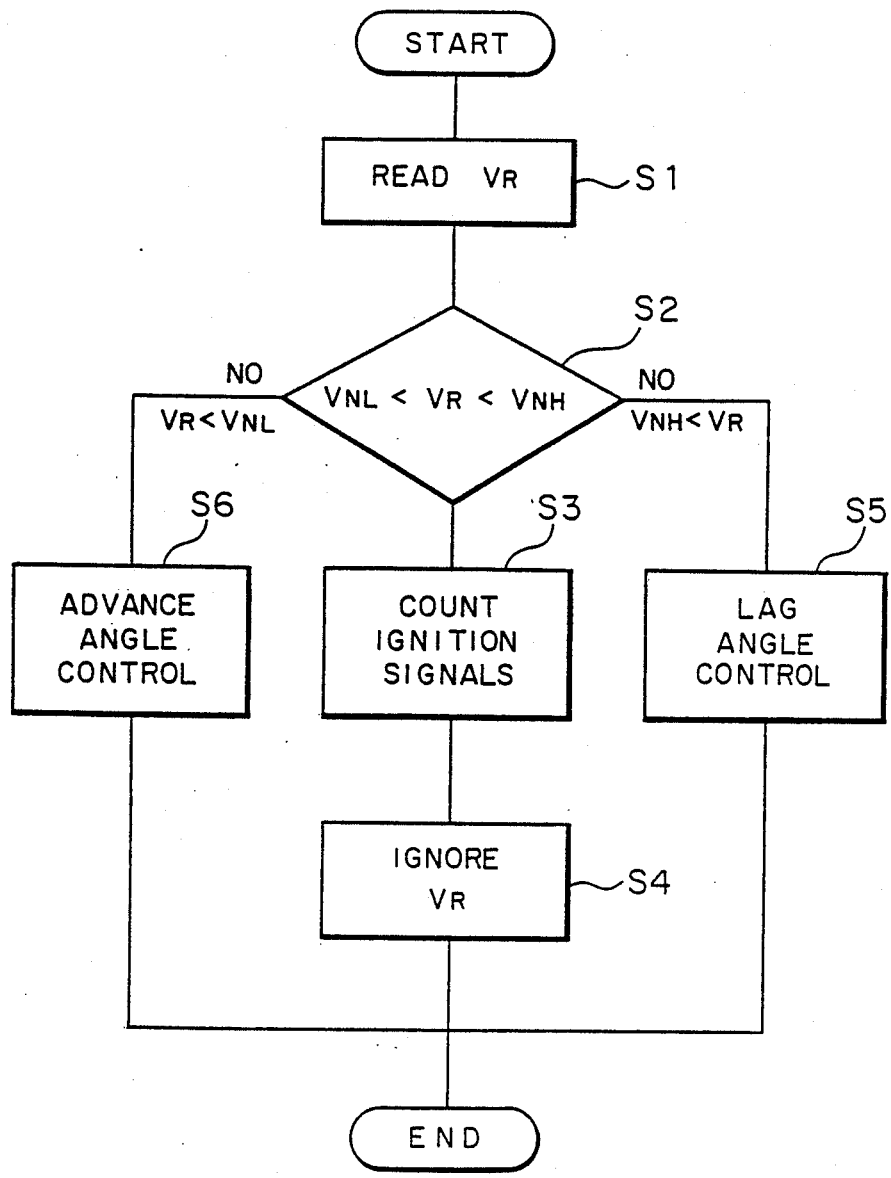
FIG. 15 is a flow chart of the operations performed by the embodiment of FIG. 14.

FIG. 15 is a flow chart of the operations performed by the embodiment of FIG. 14. When the output of the noise level sensor 5 is higher than the output of the analog gate 3, a pulse is output by the comparator 6. In accordance with this pulse, the integrator 24 outputs a knocking signal $V_R$.

In Step S1, the magnitude of this knocking signal $V_R$ is read by the window comparator 51, and in Step S2, the window comparator 51 determines whether $V_{NL} < V_R < V_{NH}$. A knocking signal $V_R$ having a level of greater than the upper limit $V_{NH}$ is determined to be a signal due to knocking. A knocking signal $V_R$ having a level of less than the lower limit $V_{NL}$ is determined to be low-level noise which will not adversely affect ignition timing. A knocking signal $V_R$ having a level between the upper limit $V_{NH}$ and the lower limit $V_{NL}$ is determined to be high-level noise which will have an adverse effect on ignition timing.

It is not mandatory to have a lower limit $V_{NL}$ for noise signals. However, if there were no lower limit $V_{NL}$, all noise signals with a level of less than $V_{NH}$ would be treated as high-level noise signals, and the noise removal circuit 50 would prevent even low-level noise signals from being input to the A/D converter 25, despite the fact that these low-level signals would not adversely affect the ignition timing. Therefore, a lower limit $V_{NL}$ is employed to prevent the noise removal circuit 50 from needless operation.

If high-level noise is detected, the window comparator 51 generates an output pulse which is input to the counter 54, which in Step S3 begins to count cylinder pulses from the cylinder pulse generator 21 so as to measure a prescribed length of time for which the output of the integrator 24 should be prevented from being input to the A/D converter 25. While counting is taking place, the output signal $V_R$ of the integrator 24 is ignored (Step S4), i.e., it is not input to the A/D converter 25, and it does not influence the ignition timing.

When knocking takes place during counting, i.e., when $V_R > V_{NH}$, the knocking signal $V_R$ of the integrator 24 is input to the A/D converter 25 and in Step S5 it is reflected in timing control so as to cause a lag angle.

On the other hand, a small knocking signal $V_R$ having a level of less than $V_{NL}$ is too small to influence the ignition timing, even if it is a signal due to knocking, and in this case, advance angle control is performed (Step S6).

The suitable levels of $V_{NL}$, $V_{NH}$, and the length of the period for which the counter 54 performs counting vary depending on the noise conditions and knocking conditions of the engine (the level and the frequency of noise and knocking) and on the level of control which is desired. They should be set so as to achieve overall harmony with other control systems of the engine.

Next, the operation of the noise removal circuit 50 will be explained in detail. The window comparator 51 determines the level of the knocking signal $V_R$ of the integrator 24 and generates an output pulse when $V_{NL} < V_R < V_{NH}$. The output pulse of the window comparator 51 causes the flip-flop 52 to reset and causes the counter 54 to begin counting the pulses from the cylinder pulse generator 21.

When the flip-flop 52 is reset, its output signal goes low, and the low output signal controls the switch 53 through the logic circuit 56, causing the circuit between the input and output sides of the switch 53 to open. As a result, the output of the integrator 24 can not be input to the A/D converter 25.

The counter 54 counts the cylinder pulses, and after counting to a prescribed level, it outputs a signal which sets the flip-flop 52.

When the flip-flop 52 is set, the switch 53 which is controlled by this output through the logic circuit 56 closes, and the output of the integrator 24 is once again able to be input to the A/D converter 25.

Thus, each time the window-comparator 51 detects high-level noise, the switch 53 is opened for a prescribed period of time which is determined by the counter 54, and signals from the integrator 24 are prevented from reaching the A/D converter 25. Therefore, the high-level noise is prevented from influencing the ignition timing.

Figure 16:
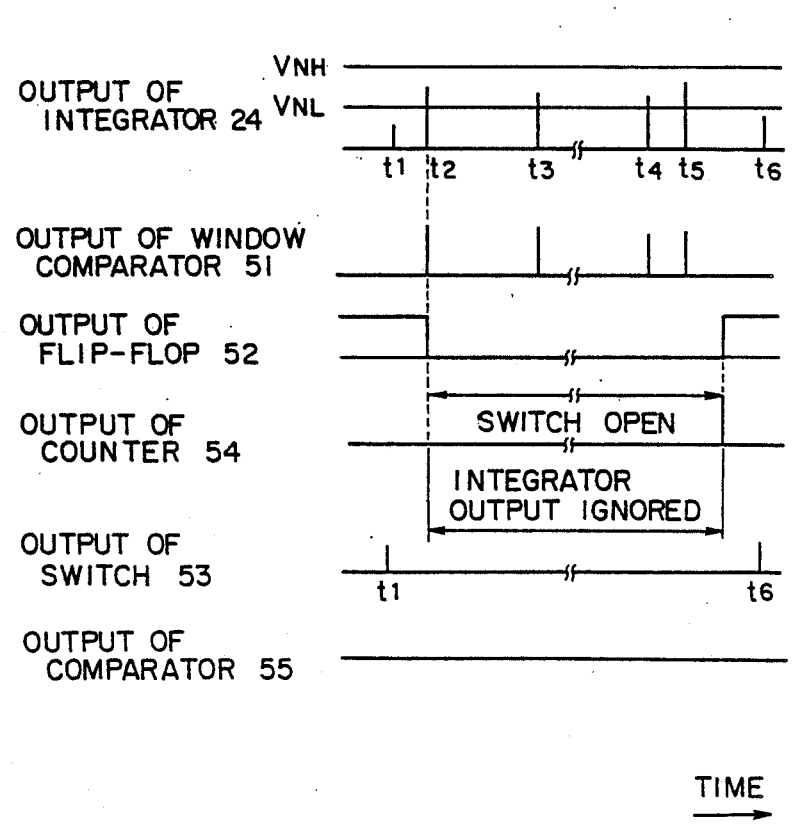
FIGS. 16a and 16b are waveform diagrams of the output signals of various portions of the embodiment of FIG. 14.

FIG. 16 is a waveform diagram showing the output signals of various portions of the noise removal circuit 50. FIG. 16A is for a four-cylinder engine which is generating high-level noise but which is not generating knocks. The firing order is the first cylinder, the third cylinder, the fourth cylinder, and then the second cylinder.

The output of the integrator 24 at time t1 occurs during the firing of the third cylinder, the output at t2 takes place during the firing of the fourth cylinder, and the outputs at times t3, t4, t5, and t6 take place during the firing of the third, the third, the fourth, and the first cylinders, respectively.

Of these outputs of the integrator 24, the outputs at times t2, t3, t4, and t5 have values between $V_{NL}$ and $V_{NH}$, and are therefore considered to be high-level noise. Accordingly, in response to the output of the integrator 24 at each of these times, the window comparator 51 generates an output.

The flip-flop 52 is reset by the output of the window comparator 51 at time t2, and the counter 54 is made to begin counting the cylinder pulses from the cylinder pulse generator 21 for a prescribed length of time. Due to the resetting of the flip-flop 52, the circuit between the input and output sides of the switch 53 is open during the period of counting by the counter 54 beginning at time t2. During this period, the output of the integrator 24 which is input to the switch 53 at times t2, t3, t4, and t5 is not input to the A/D converter 25 and is therefore ignored.

When the counter 54 finishes counting the prescribed number of pulses, at a point in time between times t5 and t6, it generates an output pulse which sets the flip-flop 52. The setting of the flip-flop 52 causes the switch 53 to close again to allow the input of signals to the A/D converter 25 from the integrator 24. Therefore, during the period of time shown in FIG. 16A, only the output signals at times t1 and t6 are input to the A/D converter 25.

The output signals of the integrator 24 at times t1 and t6 have a low level of less than $V_{NL}$, and generally they do not influence control. Even if these output signals are due to knocking, since they are of a low level, their not being reflected in control will normally cause no problems.

FIG. 16B illustrates the case in which the integrator 24 generates a signal due to knocking during a period in which the switch 53 is open. As shown in this figure, the integrator 24 generates an output signal at times t11, t12, t13, t14, t15, t16, t17, t18, and t19. The signal at time t12 is a high-level signal which causes the window comparator 51 to generate an output which sets the flip-flop 52 and causes the counter 54 to begin counting for a prescribed length of time (from time t12 until a point between time t16 and time t17). During this prescribed length of time, the circuit of switch 53 is open, and the output of integrator 24 is ignored.

At times t14 and t16, the integrator 24 generates output signals which have a level higher than $V_{NH}$ and which are therefore caused by knocking. Accordingly, the comparator 55 generates an output at times t14 and t16.

The output signals of the comparator 55 at times t14 and t16 control the switch 53 through the logic circuit 56 and cause the switch 53 to momentarily close at times t14 and t16. Therefore, at times t14 and t16, the output of the integrator 24 is not ignored but is input to the A/D converter 25 and is reflected in control.

Thus, when the output of the integrator 24 is between $V_{NL}$ and $V_{NH}$, the output of the integrator 24 is ignored for a prescribed length of time, but if during this time the output of the integrator 24 exceeds $V_{NH}$, the output of the integrator 24 is reflected in ignition timing control. The operation of this embodiment is otherwise the same as that of the apparatus of FIG. 5.

Figure 17:
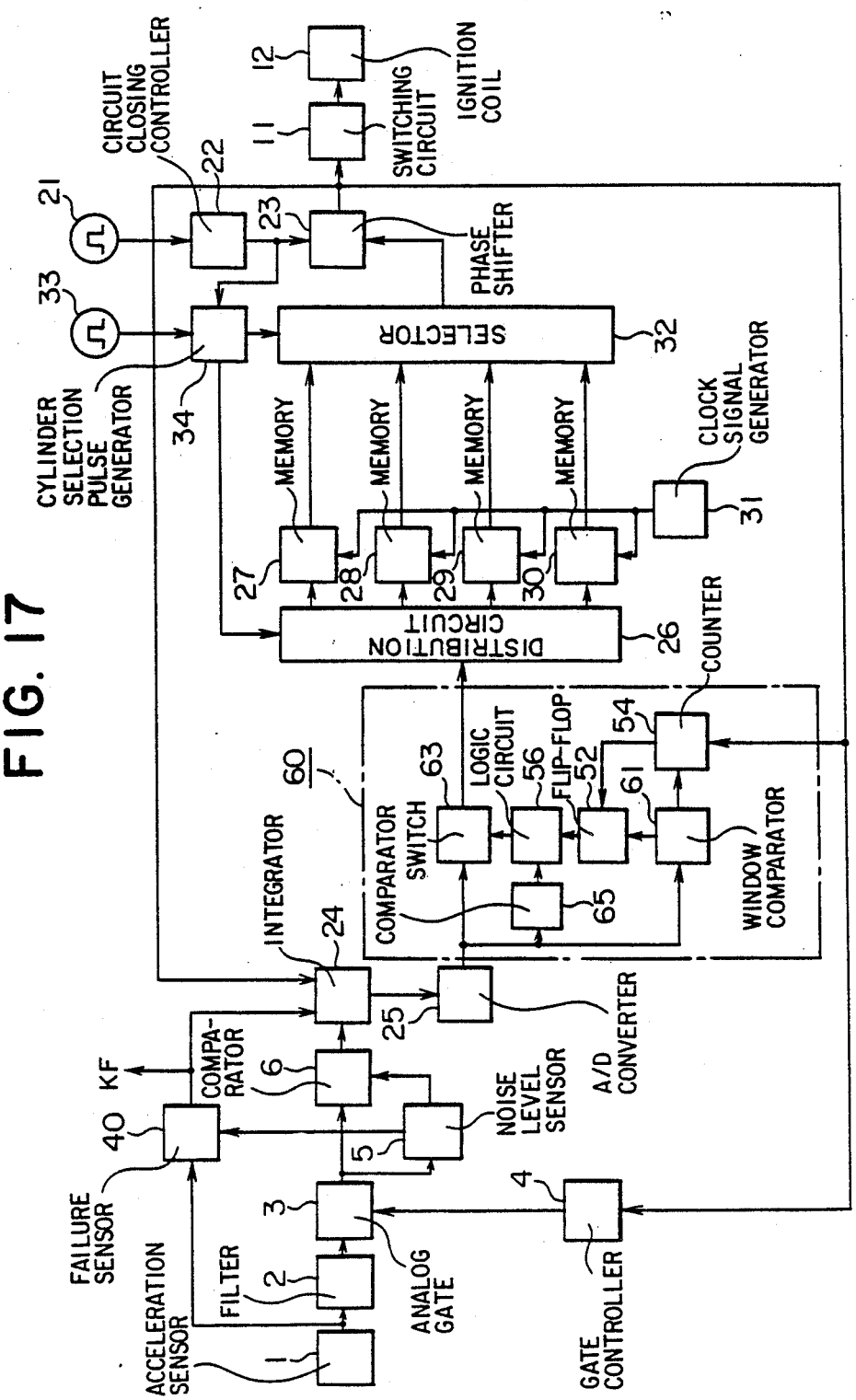
FIG. 17 is a block diagram of a second embodiment of the present invention.

In the embodiment of FIG. 14, the noise removal circuit 50 is disposed between the integrator 24 and the A/D converter 25 and therefore processes analog signals. FIG. 17 is a block diagram of a second embodiment of the present invention in which a noise removal circuit 60 for processing digital signals is disposed between an A/D converter 25, which is directly connected to the output side of an integrator 24, and a distribution circuit 26. The noise removal circuit 60 includes a digital window comparator 61, a digital switch 63, and a digital comparator 65 which correspond to the window comparator 51, the switch 53, and the comparator 55 of FIG. 14 and differ from the corresponding parts in that they handle digital instead of analog signals. The structure and operation of this embodiment are otherwise the same as for the embodiment of FIG. 14.

Figure 18:
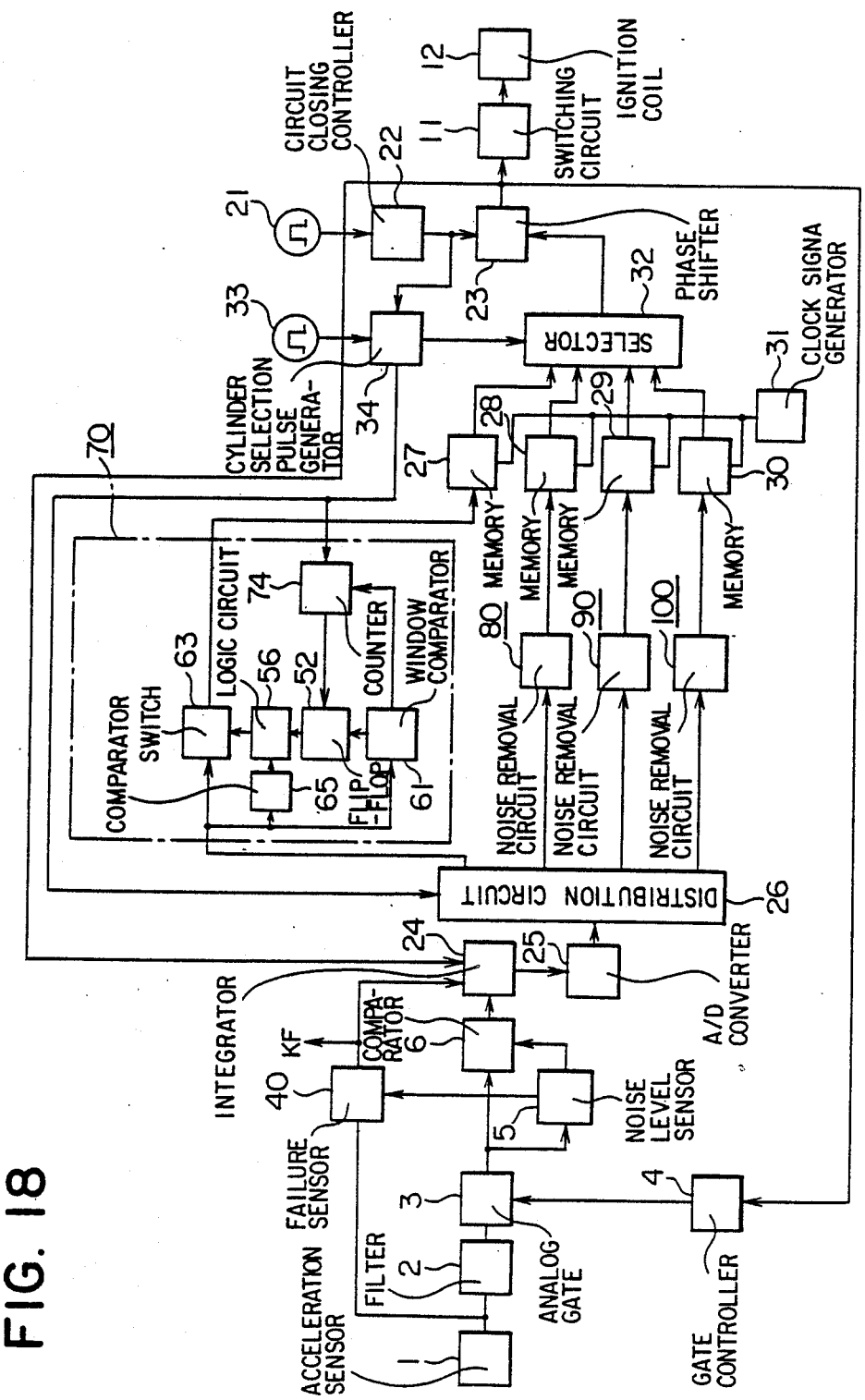
FIG. 18 is a block diagram of a third embodiment of the present invention.

In the embodiments of FIGS. 14 and 17, a single noise removal circuit is disposed on the input side of a distribution circuit 26, and the noise removal circuit processes the signals corresponding to all of the cylinders of the engine. FIG. 18 is a block diagram of a third embodiment of the present invention in which separate noise removal circuits 70, 80, 90, and 100 are provided for each of the cylinders of the engine on the output side of a distribution circuit 26.

The structure of the noise removal circuit 70 for the first cylinder is illustrated in detail. It is similar in structure to the noise removal circuit 60 of FIG. 17, but differs therefrom in that counter 54 has been replaced by a counter 74 which counts a prescribed number of the cylinder selection pulses from the cylinder selection pulse generator 34. The output of the switch 63 is input to memory 27. The output signals of the A/D converter 25 corresponding to the first cylinder only are input to the window comparator 61, the switch 63, and the comparator 65 via the distribution circuit 26.

The other noise removal circuits 80, 90, and 100 are similar in structure, and the output signals thereof are provided to memories 28–30, respectively. Because noise removal is separately performed for each cylinder, this embodiment can perform finer control than can the embodiments of FIGS. 14 and 17.

For example, referring to FIG. 16B, if the detected outputs of the integrator 24 at times t12 and t15 for the firing stroke of the fourth cylinder are knocking signals and not due to high-level noise, the outputs of the integrator 24 at times t12 and t15 should be reflected in control. In the embodiments of FIG. 14 and FIG. 17, the controllability of knocking is worsened to the extent that these outputs are ignored.

However, the program capacity basically increases in proportion to the number of cylinders when processing is performed for each cylinder. Therefore, the memories must increase in size and costs are necessarily increased. It accordingly becomes necessary to make a decision based on a balance of the characteristics of engine noise generation or desired controllability.

Figure 19:
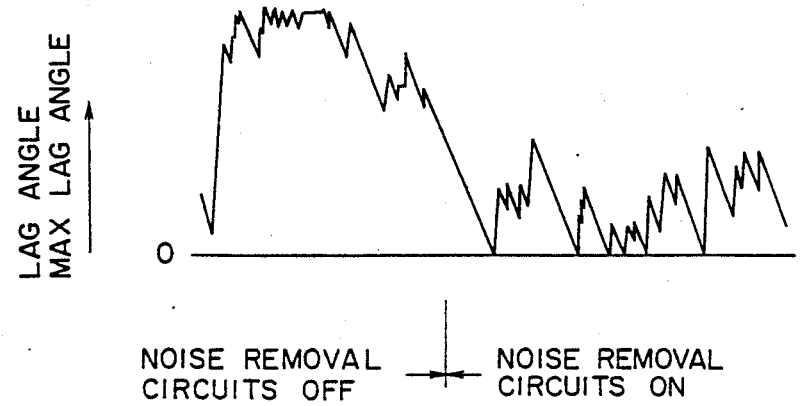
FIG. 19 is a graph of the amount of lag angle control performed by the apparatus of the present invention when installed on an actual engine.

FIG. 19 illustrates data which was obtained during the operation of an actual engine equipped with the embodiment of FIG. 18. The left half of the figure shows the lag angle when the noise removal circuits were not operated, and the right half shows the lag angle when the noise removal circuits were operated to remove high-level noise.

When the noise removal circuits were not operated to simulate a conventional apparatus, the output of the integrator 24 due to noise was extremely high, and the lag angle reached the maximum value attainable by the apparatus.

In contrast, when the noise removal circuits were operated, as shown by the right half of the figure, that portion of the output of the integrator 24 due to high-level noise was ignored and only that portion due to knocking was reflected in control, so the lag angle was greatly decreased to a suitable level, and appropriate timing control could be performed.

The counters 54 and 74 of the above-described embodiments measure prescribed lengths of time by counting pulses which correspond to the rotational angle of the crankshaft of the engine. However, these counters can be replaced by counters which count clock pulses which are generated at regular intervals independent of the rotational speed of the engine.

It can be seen that in accordance with the present invention, the timing of an internal combustion engine is adjusted in response to knocking signals, and high-level noise signals due to causes other than knocking are ignored without affecting the ability of the apparatus to detect knocking signals. As a result, unnecessary retarding of the ignition timing due to high-level noise can be prevented, and more accurate knocking suppression can be performed.

What is claimed is:

1. A knocking suppression apparatus for an internal combustion engine comprising:
   knocking sensing means for sensing accelerations of an engine including accelerations due to engine knocking and generating a corresponding output signal;
   knocking signal generating means responsive to the output signal of said knocking sensing means for generating a knocking signal indicative of the amount of knocking in the engine;
   timing control means responsive to the knocking signal for controlling the ignition timing of the engine so as to decrease the amount of knocking; and
   noise removal means connected between said knocking signal generating means and said timing control means for preventing the knocking signal from being input to said timing control means for a prescribed period when the knocking signal has a level between an upper limit and a lower limit and enabling the knocking signal to be input to said timing control means during the prescribed period when the knocking signal exceeds the upper level.

2. A knocking suppression apparatus as claimed in claim 1, wherein said noise removal means comprises:
   a controllable switch which is connected between said knocking signal generating means and said timing control means;
   window comparator means for determining when the magnitude of the knocking signal is between the upper limit and the lower limit; and
   switch control means for opening said switch for a prescribed period when said window comparator determines that the magnitude of the knocking signal is between the upper limit and the lower limit and closing said switch at the end of the prescribed period.

3. A knocking suppression apparatus as claimed in claim 2, wherein:
   said noise removal means further comprises a first comparator which determines when the knocking signal exceeds the upper limit; and
   said switch control means includes means responsive to said first comparator for closing said switch during the prescribed period when the first comparator determines that the knocking signal exceeds the upper limit.

4. A knocking suppression apparatus as claimed in claim 1, wherein said knocking signal generating means comprises:
   a band-pass filter which filters the output signal of said knocking sensing means;
   a comparator responsive to the filtered output signal which generates an output when the filtered output signal exceeds a reference level; and
   an integrator which integrates the output of the comparator and generates an output signal corresponding to the integrated value, the output signal of said integrator being the knocking signal.

* * * * *